United States Patent [19]
Odani et al.

[11] Patent Number: 5,842,021
[45] Date of Patent: Nov. 24, 1998

[54] OPTIMIZER

[75] Inventors: Kensuke Odani, Kyoto; Junko Sayama, Settsu; Akira Tanaka, Kyoto, all of Japan

[73] Assignee: Matsushita Electric Industrial Co., Ltd., Osaka-fu, Japan

[21] Appl. No.: 657,489

[22] Filed: Jun. 4, 1996

[30] Foreign Application Priority Data

Jun. 16, 1995 [JP] Japan .................................. 7-150261

[51] Int. Cl.$^6$ ........................................................ G06F 9/45
[52] U.S. Cl. ........................ 395/709; 395/674; 395/704; 395/708
[58] Field of Search .............................. 395/709, 183.14, 395/674, 704, 708

[56] References Cited

U.S. PATENT DOCUMENTS

| | | | |
|---|---|---|---|
| 4,802,091 | 1/1989 | Cocke et al. | 395/709 |
| 5,151,991 | 9/1992 | Iwasawa | 395/706 |
| 5,396,631 | 3/1995 | Hayashi et al. | 395/707 |
| 5,659,754 | 8/1997 | Grove et al. | 395/709 |

FOREIGN PATENT DOCUMENTS

04017031 A  1/1992  Japan .

OTHER PUBLICATIONS

Alfred V. Aho et al: "Compilers, Principles, Techniques and Tools," 1986, Addison–Wesley, Reading MA, US XP002027306 12087, pp. 585–586, 595, 600–601, 636–638 and 681–683.

ACM Transactions On Programming languages and Systems, vol. 12, No. 4, 1 Oct. 1990, pp. 501–536, XP000255879, Chow F.C. et al.: "The Priority–Based Coloring Approach to Register Allocation.".

Patent Abstracts of Japan, vol. 016, No. 175 (P–1344), 27 Apr. 1992 and JP 04 017031 A (NEC CORP), 21 Jan. 1992, English abstract only.

European Application Communication dated Apr. 2, 1997 from the European Patent Office.

*Primary Examiner*—James P. Trammell
*Assistant Examiner*—Yvonne Banh
*Attorney, Agent, or Firm*—Panitch Schwarze Jacobs & Nadel, P.C.

[57] ABSTRACT

The definition and use information of a constant hold variable are caused to be stored in a constant hold variable information hold unit 6 by a constant hold variable definition detection unit 7 and a use expression detection unit 8. A partial constant expression rewrite unit 9 rewrites to a constant a constant hold variable which, when a variable is rewritten to a constant, allows an expression containing the variable to be convoluted into a constant. A cost judgement and rewrite unit 10 judges by a cost whether the variable is to be used with loading it in a register or constant propagation is to be conducted, and, if constant propagation is to be conducted, rewrites the variable with a constant. A resource allocation unit 11 allocates the variable to a resource. A memory variable rewrite unit 12 rewrites a constant hold variable allocated to a memory to a constant value. A constant hold variable definition removal unit 13 removes the definition of a constant hold variable which becomes unnecessary.

8 Claims, 14 Drawing Sheets

FIG. 5

| Instruction | | Size | Cycle | |
|---|---|---|---|---|
| Constant hold variable definition | 8-Bit constant | 2 | 1 | ←c1 |
| | 16-Bit constant | 3 | 1 | |
| | 24-Bit constant | 5 | 3 | |
| Addition of register variables | | 1 | 1 | ←c2 |
| Addition of register variable and constant | 8-Bit constant | 2 | 1 | ←c3 |
| | 16-Bit constant | 4 | 2 | |
| | 24-Bit constant | 5 | 3 | |
| Load from memory | | 3 | 1 | |
| Store into memory | | 3 | 1 | |

— 15

| Instruction set (extract) | Size | Cycle |
|---|---|---|
| Load constant | | |
|     movi #imm8, Dn | 2 | 1 |
|     movi #imm16, Dn | 3 | 1 |
|     movi #imm24, Dn | 5 | 3 |
| Operation of registers (add, sub) | | |
|     add Dn, Dn | 1 | 1 |
| Operation of register and constant (add, sub) | | |
|     add #imm8, reg | 2 | 1 |
|     add #imm16, reg | 4 | 2 |
|     add #imm24, reg | 5 | 3 |
| Load from memory | | |
|     mov @mem, D0 | 3 | 1 |
| Store into memory | | |
|     mov D0, @mem | 3 | 1 |

```
s1: (Removed)
s2: a1 = 200 + x
s3: b = 10200
s4: b1 = b + x
s5: b2 = b + y
```

FIG. 7F

```
s1: (Removed)
s2: a1 = 200 + x
s3: (Removed)
s4: b1 = 10200 + x
s5: b2 = 10200 + y
```

FIG. 8A

| Variable name | Definition position | Value | Resource | Use position | Use attribute |
|---|---|---|---|---|---|
| a | s1 | 200 | | s2 | Non-propagation |
| | | | | s3 | Non-propagation |

FIG. 8B

| Variable name | Definition position | Value | Resource | Use position | Use attribute |
|---|---|---|---|---|---|
| a | s1 | 200 | | s2 | Non-propagation |
| | | | | s3 | Propagation |
| b | s3 | 10200 | | s4 | Non-propagation |
| | | | | s5 | Non-propagation |

FIG. 8C

| Variable name | Definition position | Value | Resource | Use position | Use attribute |
|---|---|---|---|---|---|
| a | s1 | 200 | | s2 | Propagation |
| | | | | s3 | Propagation |
| b | s3 | 10200 | | s4 | Non-propagation |
| | | | | s5 | Non-propagation |

FIG. 8D

| Variable name | Definition position | Value | Resource | Use position | Use attribute |
|---|---|---|---|---|---|
| a | s1 | 200 | Register | s2 | Propagation |
| | | | | s3 | Propagation |
| b | s3 | 10200 | Register | s4 | Non-propagation |
| | | | | s5 | Non-propagation |

FIG. 8E

| Variable name | Definition position | Value | Resource | Use position | Use attribute |
|---|---|---|---|---|---|
| a | s1 | 200 | Register | s2 | Propagation |
| | | | | s3 | Propagation |
| b | s3 | 10200 | Memory | s4 | Propagation |
| | | | | s5 | Propagation |

FIG. 9

Instruction set (extract)

| | Size | Cycle |
|---|---|---|
| Load constant | | |
|     movi #imm8, Dn | 2 | 1 |
|     movi #imm16, Dn | 3 | 1 |
|     movi #imm24, Dn | 5 | 3 |
| Operation of registers (add, sub) | | |
|     add Dn, Dn | 1 | 1 |
| Operation of register and constant (add, sub) | | |
|     add #imm8, reg | 2 | 1 |
|     add #imm16, reg | 4 | 2 |
|     add #imm24, reg | 5 | 3 |
| Load from memory | | |
|     mov @mem, D0 | 3 | 1 |
| Store into memory | | |
|     mov D0, @mem | 3 | 1 |

FIG. 10

Cost storage unit

| Instruction | | Size | Cycle | |
|---|---|---|---|---|
| Constant hold variable definition | 8-Bit constant | 2 | 1 | ←c1 |
| | 16-Bit constant | 3 | 1 | |
| | 24-Bit constant | 5 | 3 | |
| Addition of register variables | | 1 | 1 | ←c2 |
| Addition of register variable and constant | 8-Bit constant | 2 | 1 | ←c3 |
| | 16-Bit constant | 4 | 2 | |
| | 24-Bit constant | 5 | 3 | |

```
s1:  a = 10000
s2:  a1 = a + x
s3:  a2 = a + y
s4:  b = 30000   Removed
     ⋮
s9:  u = 10000 + b
s10: z = b + 45000
s11: v = b + z
s15: d = u + 2000
```

FIG. 11E

```
s1:  a = 10000
s2:  a1 = a + x
s3:  a2 = a + y
s4:  (Removed)
     ⋮
s9:  u = 40000
s10: z = 75000
s11: v = 105000
s15: d = u + 2000
```

FIG. 11F

```
s1:  a = 10000
s2:  a1 = a + x
s3:  a2 = a + y
s4:  (Removed)
     ⋮
s9:  (Removed)
s10: (Removed)
s11: v = 105000
s15: d = 42000
```

|  | size | cycle |
|---|---|---|
| movi #10000, D0 | 3 | 1 |
| add  D0, D1 | 1 | 1 |
| add  D0, D2 | 1 | 1 |
| total | 5 | 3 |

```
s1:  a = 10000  Removed
s2:  a1 = 10000 + x
s3:  a2 = 10000 + y
s4:  b  = 20000 + 10000 → b=30000
       ⋮
s9:  u  = 10000 + b
s10: z  = b + 45000
s11: v  = b + z
s15: d  = u + 2000
```

FIG. 13C (Prior Art)

```
s1:  (Removed)
s2:  a1 = 10000 + x
s3:  a2 = 10000 + y
s4:  b  = 30000           38
       ⋮
s9:  u  = 10000 + b
s10: z  = b + 45000
s11: v  = b + z
s15: d  = u + 2000
```

FIG. 13D (Prior Art)

```
s1:  (Removed)
s2:  a1 = 10000 + x
s3:  a2 = 10000 + y
s4:  b  = 30000  Removed
       ⋮
s9:  u  = 10000 + 30000
s10: z  = 30000 + 45000
s11: v  = 30000 + z
s15: d  = u + 2000
```

FIG. 13E (Prior Art)

```
s1:  (Removed)
s2:  a1 = 10000 + x
s3:  a2 = 10000 + y
s4:  (Removed)
       ⋮
s9:  u  = 40000
s10: z  = 75000
s11: v  = 105000
s15: d  = u + 2000
```

FIG. 13F (Prior Art)

```
s1:  (Removed)
s2:  a1 = 10000 + x
s3:  a2 = 10000 + y
s4:  (Removed)
       ⋮
s9:  (Removed)
s10: (Removed)
s11: v  = 105000
s15: d  = 42000
```

FIG. 14 (Prior Art)

```
                    size  cycle
add    #10000, D1    4     2
add    #10000, D2    4     2
---------------------------------
total                8     4
```

OPTIMIZER

FIELD OF THE INVENTION AND RELATED ART STATEMENT

1. Field of the Invention

The invention relates to an optimizer which is disposed in a compiler for compiling a program written in a high level language to a machine language program, and which optimizes a source program or an intermediate language program in order to produce a high-efficiency machine language program.

2. Description of the Related Art

Recently, it is vigorously conducted to write a source program in a high level language so that the efficiency of developing a machine language program or an assembler program is improved. The machine language program in the following description includes the assembler program. A source program written in a high level language is compiled by a compiler to a machine language program. Such a compiler is provided with an optimizer. A program written in a programming language is rewritten by the optimizer so as to be efficiently executed in a micro processor of a target machine.

On the other hand, a machine language program which is efficient as high as possible is requested. Therefore, the optimizer rewrites a program in various manners in order to minimize the total running time of a finally produced machine language program and the total size of the program (the total running time of a finally prepared machine language program, or a memory size of such a machine language program is generally called "cost").

Processes conducted by an optimizer include the constant propagation process and the constant folding process which are used for rewriting a program so as to reduce the total running time and the memory size of a machine language program. When these processes are alternately repeated, the optimizer can largely reduce the number of expressions in the program. This will be described with reference to diagrams of FIGS. 13A to 13F.

FIG. 13A shows a program in a state of an intermediate language. In the figure, symbols s1, s2, s3, . . . which are shown in the left edge indicate positions in the program, respectively. A code of a program (such as "a+x," or "20000+a" shown in the figure) which is configured by an operand that is a constant or a variable, and an operator is called "an operation expression." In the specification, also an expression consisting of only a constant or a variable, such as "a" or "20000" is called an operation expression.

A code of a program (such as "a1=a+x" in FIG. 13B) which has a variable on the left side of an equal sign and an operation expression on the right side, or a series of codes such as "a=b" in which the right side is a variable or a constant is called "substitution expression." Furthermore, a substitution expression "b=20000+10000" which is at the position s4 in FIG. 13B and in which all operands are constants is particularly called "constant expression."

The proceeding in which, in accordance with a substitution expression, a value on the right side of an equal sign is substituted into a variable written in the left side is referred to as "definition of a variable." Use of the valuable for an operand of the operation expression is referred to as "use of the valuable". As in the case of "a=b," the configuration in which a variable appears in the right side of a substitution expression is referred to as "use."

Referring to FIG. 13A, in the substitution expression at the position s1, a constant "10000" is substituted into a variable "a". Such a variable into which a constant is substituted is called "a constant hold variable." Four arrows elongate from the variable "a", and respectively terminate at other variables "a". The arrows indicate operation expressions wherein the variable "a" is used as an operand. The optimizer detects all constant hold variables, and further detects operation expressions wherein the constant hold variable is used as an operand. After the detection, the optimizer rewrites the constant hold variable which is used as an operand in the operation expressions, to its hold value. As a result of this rewriting, the operation expressions in the program of FIG. 13A are rewritten from the operation expressions wherein the constant hold variable "a" is used as an operand to those wherein its hold value "10000" is used as an operand.

FIG. 13B shows the result of this rewriting. In the figure, the variables x and y remain unchanged because they are variables which are not a constant hold variable, such as variables holding a return value of a function.

Furthermore, it will be seen that this rewriting causes the substitution expression "a=10000" at the position s1 to become redundant. The optimizer judges the substitution expression to be a redundant substitution expression and deletes the substitution expression so that the code size of the expression is reduced. The above-described processes of rewriting operands and deleting a substitution expression which becomes redundant as a result of the rewriting process are called "constant propagation."

It will be seen that this rewriting causes the substitution expression at the position s4 to become "b=20000+10000" which is equivalent to a substitution expression "b=30000." When a constant expression such as "b=20000+10000" appears in the program, the optimizer rewrites the constant expression to a substitution expression "b=30000", equivalent to the constant expression. The proceeding of rewriting a constant expression to an equivalent constant is called "constant folding." When the optimizer conducts constant folding, the substitution expression "b=30000" appears in the program, and the variable "b" at the position s4 becomes a new constant hold variable.

When the new constant hold variable appears as a result of the "propagation" and folding, in the same manner as the case of the constant hold variable "a", the optimizer searches an operation expression wherein the constant hold variable "b" is an operand. Three arrows elongate from the variable "b", and respectively terminate at other variables "b". The arrows indicate operation expressions wherein the variable "b" is used as an operand. The optimizer searches operation expressions at the positions s9, s10, and s11, and rewrites the constant hold variable "b" which is used in the operation expressions as an operand, to its hold value "30000." As a result of this rewriting, the operation expressions at the positions s9, s10, and s11 are respectively rewritten to "u=10000+30000," "z=30000+45000," and "v=30000+z," as shown in FIG. 13D. After this rewriting, the optimizer conducts constant folding so that the substitution expressions at the positions s9 and s10 are rewritten to "u=40000" and "z=75000," respectively. This rewriting causes the variables "u" and "z" to become a constant hold variable. Therefore, the optimizer further repeats "propagation" and constant folding for the variables. When "propagation" and constant folding are repeated in this way, value propagation for the constant hold variable "u" is conducted as shown in FIG. 13E, and the substitution expressions at the positions s4, s9, and s10 are deleted, so that the program becomes very simple as shown in FIG. 13F.

After constant propagation and constant folding are conducted as described above, the optimizer conducts a resource allocation process, so that variables remaining in the program are allocated to registers or a memory. In the resource allocation, the optimizer allocates variables having live ranges which overlap with each other, to different registers, because of the following reason. A live range is a range in a program extending from the substitution of a variable to the final use of the variable. When variables having live ranges which overlap with each other are allocated to the same register, a number of processes of saving and restoring values held by the register are required in a machine language program. Hereupon, in the case where the target machine has a small number of registers and many variables having live ranges which overlap with each other are used; the optimizer allocates some of the variables to a memory. After the allocation process is conducted as described above, the compiler generates codes on the basis of the allocation result and then the machine language program shown FIG. 14.

When, as described above, the resource allocation process is conducted after the processes of constant propagation and constant folding and the deletion of constant hold variables, the number of duplicate portions of live ranges is reduced by the amount corresponding to the deletion. Therefore, it is possible to effectively use the registers. Consequently, a code size and the number of execution cycles of the produced machine language program decrease.

In the prior art, however, an operand of an operation expression is rewritten to its hold value by constant propagation and constant folding, and hence a machine language code is generated in which an immediate data of a longer byte length is used as an operand. As a result, there may arise problems in that the running time of the machine language program is prolonged and that the memory size is enlarged.

It is assumed that the variables "a1" and "a2" in the program which is rewritten as shown in FIG. 13D by constant propagation and constant folding are allocated to registers D1 and D2, respectively, and that, as a result, the machine language codes shown in FIG. 14 are generated.

The value "#10000" which is in the machine language codes "add #10000, D1" and "add #10000, D2" in FIG. 14 each having a symbol # is an immediate value that is 2 bytes long. These machine language codes are incorporated with an immediate value of a 2-byte length. Therefore, it will be seen that, as compared with the case of the machine language instructions shown in FIG. 12 wherein registers are used as an operand, the running time of the machine language program is longer and the memory size becomes larger.

In order to prevent an immediate value from being incorporated, it may be contemplated that "propagation" of the variable "a" is not conducted. In this case, however, "b=20000+a" cannot be folded in "b=30000", and the hold value "30000" of the variable "b" cannot be propagated to the substitution expressions "z=b+45000" and "v=b+z." When the variable "b" cannot be propagated, it is impossible to delete the variables "z" and "u" from the program and hence the program cannot be simplified.

OBJECT AND SUMMARY OF THE INVENTION

In view of the problems discussed above, it is an object of the invention to provide an optimizer in which constant propagation and constant folding are effectively conducted and the cost increase due to constant propagation can be prevented from occurring.

In order to attain the object, the optimizer of the invention is an optimizer which is disposed in a compiler for compil-ing a program written in a programming language to a machine language program, and optimizes a program written in a programming language and outputs an optimized program, comprising:

management means for managing a constant hold variable which is a variable into which a constant is to be substituted, as a related expression set of the constant hold variable, by associating an expression wherein a constant is substituted into the constant hold variable with an expression wherein the constant hold variable is an operand;

first rewrite means for rewriting, among expressions in the related expression set wherein a constant hold variable is an operand, an expression wherein any other operand is a constant, and an expression of unary operation wherein the constant hold variable is an operand, to an expression wherein a constant held by the constant hold variable is an operand;

first estimation means for, after rewriting of the first rewrite means is conducted, when a constant hold variable which has not been rewritten to a constant is replaced with a constant immediate data held by the constant hold variable and set as an operand of a machine language operation, estimating an execute cycle and/or a code size of machine language instructions generated from an expression wherein the constant hold variable is an operand, in a variable related expression set of the constant hold variable, on the basis of a byte length of the constant;

second estimation means for, after rewriting of the first rewrite means is conducted, when a register storing a constant held by a constant hold variable which has not been rewritten to a constant is set as an operand of a machine language operation, estimating an execute cycle and/or a code size of machine language instructions generated from an expression wherein a constant is substituted into the constant hold variable and an expression wherein the constant hold variable is an operand, in a related expression set of the constant hold variable;

comparison means for comparing an estimation result of the first estimation means with an estimation result of the second estimation means, for each related expression set;

second rewrite means for, in a related expression set wherein, as a result of comparison of the comparison means, the estimation result of the first estimation means is not more than the estimation result of the second estimation means, rewriting any constant hold variable used as an operand to a constant of the constant hold variable; and third rewrite means for, when any expression wherein a constant hold variable is used as an operand is rewritten to an expression wherein a constant held by a constant hold variable is used as an operand, deleting an expression wherein a constant is substituted into the constant hold variable.

The optimizer of the invention may further comprise:

fourth rewrite means for rewriting an expression wherein any operand is made a constant by rewriting conducted by the first and second rewrite means, to a constant which is an operation result of a constant expression;

control means for causing the new constant hold variable into which the operation result is to be substituted in the expression generated by rewriting conducted by the fourth rewrite means, an expression wherein a constant is substituted into the constant hold variable, and any expression wherein the constant hold variable is used as an operand, to be managed as a related expression set of the constant hold variable by the management means; and activation means for activating the first rewrite means for a related expression set which is newly managed by the management means.

The optimizer of the invention may further comprise:

resource allocation means for, after rewriting and deletion conducted by the second rewrite means, allocating variables in the program to registers or a memory, on the basis of an overlap state of live ranges of the variables and a use frequency of each variable; and fifth rewrite means for conducting a judgement of a constant hold variable on the variables which are allocated to the memory by the resource allocation means, and rewriting any constant hold variable which is an operand in a related expression set of a judged constant hold variable, to the constant.

The optimizer of the invention may further comprise:

cost storage means for storing a plurality of machine language instructions and a cost indicative of an execute cycle and/or a code size of each of the machine language instructions, with associating the instruction with the cost, the first estimation means comprises:
  first replace means for, after rewriting conducted by the first rewrite means, replacing each expression in the related expression set wherein a constant hold variable is an operand, with machine language instructions wherein a constant hold variable of the expression is an operand as an immediate data indicative of the constant which is a value held by the constant hold variable; and
  first accumulation means for reading out a cost associated with each replaced machine language instruction from the cost storage means, accumulating the read out costs, and setting an accumulation result as an estimation result, and the second estimation means comprises:
  second replace means for, after rewriting conducted by the first rewrite means, replacing, in the related expression set, each expression wherein a constant is substituted into the constant hold variable and each expression wherein a constant hold variable is an operand, with machine language instructions wherein a register storing the constant is set as an operand; and
  second accumulation means for reading out a cost associated with each replaced machine language instruction from the cost storage means, accumulating the read out costs, and setting an accumulation result as an estimation result.

According to the optimizer of the invention, the management means manages a constant hold variable which are variables into which a constant is to be substituted, as a related expression set of the constant hold variable, by associating an expression wherein a constant is substituted into the constant hold variable with an expression wherein the constant hold variable is an operand. Among expressions in the related expression set wherein a constant hold variable is an operand, an expression wherein any other operand is a constant, and an expression of unary operation wherein the constant hold variable is an operand are rewritten by the first rewrite means to an expression, therein the constant held by the constant hold variable being an operand.

After the first rewrite means conducts the rewriting operation, the first estimation means estimates the execute cycle and/or the code size of machine language instructions generated from an expression, wherein the constant hold variable is an operand, in a related expression set of a constant hold variable which has not been rewritten to a constant.

In the machine language instructions, an immediate data indicative of the constant held by the constant hold variable is set as an operand of a machine language operation. From an expression in the related expression set wherein the constant hold variable is an operand, for example, machine language instructions is generated wherein one operand is a register or a memory and another operand is an immediate value. The first estimation means estimates the execute cycle and/or the code size of the machine language instruction in the unit of a related expression set on the basis of the byte length of the constant.

On the other hand, after the first rewrite means conducts the rewriting operation, the second estimation means estimates the execute cycle and/or the code size of machine language instructions generated from an expression wherein a constant is substituted into a constant hold variable and an expression therein the constant hold variable being an operand, in a related expression set of the constant hold variable which has not been rewritten to a constant. In the machine language instructions, a register storing the constant held by the constant hold variable is set as an operand of a machine language. From an expression in the related expression set wherein a constant is substituted into the constant hold variable, for example, machine language instructions such as substitution of a constant immediate data into a register or a memory is generated. From an expression in the related expression set wherein the constant hold variable is an operand, machine language instructions is generated, wherein one operand is a register or a memory and another operand is a register storing a constant. The second estimation means estimates the execute cycle and/or the code size of the machine language instructions in the unit of a related expression set on the basis of the byte length of the constant.

The comparison means compares an estimation result of the first estimation means with an estimation result of the second estimation means, for each related expression set. In a related expression set wherein, as a result of comparison of the comparison means, the estimation result of the first estimation means is not more than the estimation result of the second estimation means, the second rewrite means rewrites any constant hold variable used as an operand to a constant held in the constant hold variable. When any constant hold variables used as an operand is rewritten to a constant in this way, an expression wherein all constants are substituted into the constant hold variable becomes redundant. Therefore, the expression wherein a constant is substituted into the constant hold variable is deleted from the program by the third rewrite means.

As described above, constant propagation on an operation expression wherein one operand is a constant hold variable is conducted only when the estimation result of the first estimation means is no more than the estimation result of the second estimation means. Consequently, the cost increase due to constant propagation can be prevented from occurring.

Furthermore, according to the optimizer of the invention, an expression wherein any operand is made a constant by rewriting conducted by the first and second rewrite means is rewritten by the fourth rewrite means to an expression wherein an operation result is substituted. An expression wherein any operand is made a constant is an expression wherein no variable exists on the right side of an equal sign, such as "d=100+200" or "s=30+10*4." The operation result is a constant (immediate data) which is equivalent to a constant expression, such as "300" in the case of "100+200" and "70" in the case of "30+10*4." As a result of rewriting conducted by the first rewrite means, among expressions in the related expression set, an expression wherein any other operand is a constant, and an expression of unary operation wherein the constant hold variable is an operand are in the sate where folding is enabled. When such an expression is convoluted, a variable substituted in the expression becomes a constant hold variable. When constant propagation is conducted on the constant hold variable, simplification of the program can be performed in the same level as the prior art.

After rewriting of the fourth rewrite means is conducted, the control means causes the new constant hold variable into which the operation result is to be substituted in the expression generated by the rewriting, the expression wherein a constant is substituted into the constant hold variable, and any expression wherein the constant hold variable is used as an operand, to be managed as a related expression set of the constant hold variable by the management means. The first rewrite means is activated on the related expression set which is newly managed by the management means. When the first rewrite means is activated, the first and second estimation means are then activated, and the second rewrite means is activated. Therefore, also the new constant hold variable related expression set is subjected to estimation of the execute cycle and/or the code size, and to rewriting of expressions in the related expression set on the basis of the estimation result.

Furthermore, according to the optimizer of the invention, after rewriting conducted by the second rewrite means, the resource allocation means allocates variables in the program to registers or a memory, on the basis of an overlap state of live ranges of the variables and a use frequency of each variable. Among variables which are allocated to the memory by the resource allocation means, a variable which is a constant hold variable is judged. The fifth rewrite means rewrites any constant hold variable which is an operand in a related expression set of the judged constant hold variable, to the constant held in the constant hold variable. When any expression wherein a constant hold variable is used as an operand is rewritten to an expression wherein the constant held by the constant hold variable is used as an operand, the third rewrite means deletes an expression wherein a constant is substituted into the constant hold variable.

Furthermore, according to the optimizer of the invention, a plurality of machine language instructions and a cost indicative of the execute cycle and/or the code size of each machine language instruction are stored into the cost storage means, with associating the instruction with the cost.

After rewriting is conducted by the first rewrite means, in the related expression set, each expression wherein a constant hold variable is an operand is replaced by the first replace means with machine language instructions wherein a constant hold variable is replaced with the immediate data held by the constant hold variable and then used as an operand. A cost associated with each replaced machine language instruction is read out from the cost storage means. The first accumulation means accumulates the read out costs and sets the accumulation result as the estimation result.

After rewriting is conducted by the first rewrite means, in the related expression set, each expression wherein a constant is substituted into the constant hold variable and each expression wherein the constant hold variable is an operand are replaced by the second replace means with machine language instructions wherein a register storing the constant is set as an operand. The cost associated with each replaced machine language instruction is read out from the cost storage means. The second accumulation means accumulates the read out costs and sets the accumulation result as the estimation result.

BRIEF DESCRIPTION OF THE DRAWINGS

FIG. 5 is a diagram showing an example of contents held in a cost hold unit 15.

FIG. 7A through FIG. 7F are diagrams showing an example of a source program and an intermediate language program, and the manner of rewriting the example.

FIG. 7A shows an example of a source program.

FIG. 7B shows an example of an intermediate language program which has passed through the partial constant expression rewrite unit.

FIG. 7C shows an example of an intermediate language program which has passed through the cost judgement and rewrite unit.

FIG. 7D shows an example of an intermediate language program which has passed through the memory variable rewrite unit.

FIG. 7E shows an example of an intermediate language program which has passed through a constant hold variable definition removal unit.

FIG. 7F shows an example of an intermediate language program which has passed through the constant hold variable definition removal unit.

FIG. 8A through FIG. 8E are diagrams showing the transition manner of contents of constant variable information.

FIG. 8A shows an example of constant variable information which has been subjected to the process of a use expression detection unit 8.

FIG. 8B shows an example of constant variable information which has been subjected to the process of the partial constant expression rewrite unit 9.

FIG. 8C shows an example of constant variable information which has been subjected to the process of the cost judgement and rewrite unit 10.

FIG. 8D shows an example of constant variable information which has been subjected to the process of the memory variable rewrite unit 12.

FIG. 8E shows an example of constant variable information which has been subjected to the process of the memory variable rewrite unit 12.

FIG. 9 shows an example of an instruction set of a micro processor.

FIG. 10 shows an example of information registered in the cost hold unit 15.

FIG. 11A is a diagram showing an example of a source program and an intermediate language program, and the manner of rewriting the example.

FIG. 11B shows an example of an intermediate language program which has passed through the partial constant expression rewrite unit.

FIG. 11C shows an example of an intermediate language program which has been subjected to constant propagation and constant folding.

FIG. 11D shows an example of an intermediate language program which has been subjected to constant propagation and constant folding.

FIG. 11E shows an example of an intermediate language program which has been subjected to constant propagation and constant folding.

FIG. 11F shows an example of an intermediate language program which has been subjected to constant propagation and constant folding.

FIG. 12 shows an example of a machine language program which has passed through the optimizer of the invention.

FIG. 13A is a diagram showing an example of a source program and an intermediate language program, and the manner of rewriting the example by a prior art optimizer.

FIG. 13B shows an example of an intermediate language program which has been subjected to constant propagation and constant folding in the prior art.

FIG. 13C shows an example of an intermediate language program which has been subjected to constant propagation and constant folding in the prior art.

FIG. 13D shows an example of an intermediate language program which has been subjected to constant propagation and constant folding in the prior art.

FIG. 13E shows an example of an intermediate language program which has been subjected to constant propagation and constant folding in the prior art.

FIG. 13F shows an example of an intermediate language program which has been subjected to constant propagation and constant folding in the prior art.

FIG. 14 is a diagram showing a machine language program which is generated after the prior art optimizer conducts constant propagation and constant folding.

DESCRIPTION OF THE PREFERRED EMBODIMENT

Hereinafter, an embodiment of the optimizer of the invention will be described with reference to the accompanying drawings. The optimizer is disposed in a compiler for a high level language such as C language, and activated after the compiler conducts a lexical analysis, a syntax analysis, and a semantic analysis on a source program. The program to be processed is an intermediate language program which is to be output as the analysis result after the compiler conducts a lexical analysis, a syntax analysis, and a semantic analysis.

Configuration of the Compiler

Figure 1A:
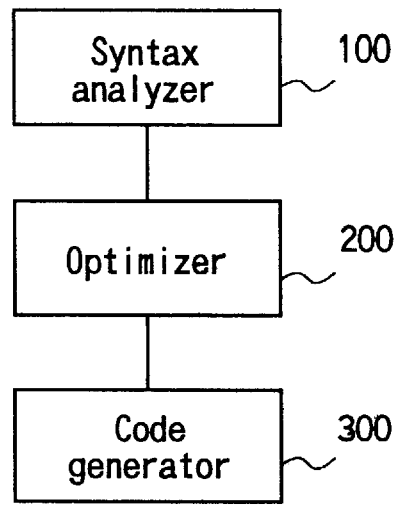
FIG. 1A is a diagram of the configuration of the compiler.

FIG. 1A is a diagram of the configuration of the compiler in the embodiment of the invention. The compiler comprises a syntax analyzer 100, an optimizer 200, and a code generator 300.

The syntax analyzer 100 conducts a lexical analysis, a syntax analysis, and a semantic analysis on the source program which is stored as a file. The analysis result is output in the form of an intermediate language program.

The optimizer 200 optimizes the intermediate language program so that the program size of a finally prepared machine language program is reduced and the running time is shortened.

The code generator 300 converts the optimized intermediate language program into machine language instructions of the target machine, and outputs the instructions in the form of a machine language program.

Configuration of the Optimizer 200

Figure 1B:
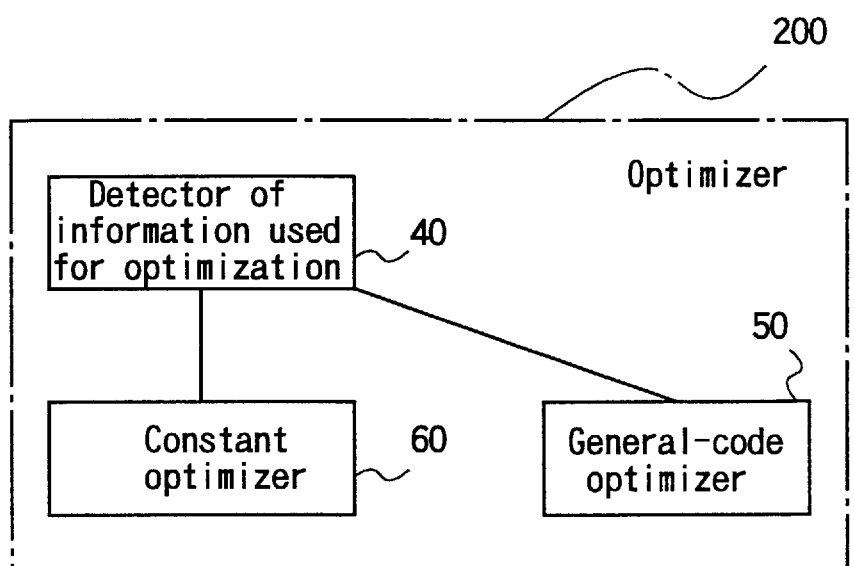
FIG. 1B is a diagram of the configuration of an optimizer 200 in the configuration of the compiler shown in FIG. 1A.

FIG. 1B is a diagram of the configuration of the optimizer 200 shown in FIG. 1A. The optimizer 200 comprises an optimization information detector 40, a general-code optimizer 50, and a constant optimizer 60.

The optimization information detector 40 conducts a data flow analysis and a control flow analysis, and detects information required for an optimization process. The data flow analysis is an analysis of positions where variables are defined and referred, for example. The control flow analysis is an analysis of control flows in the program.

The general-code optimizer 50 conducts optimization operations except constant optimization, such as dead-code elimination, inline expansion, and code motion of a loop invariant expression. The other optimization operations such as dead-code elimination, inline expansion, and code movement of a loop invariant expression are not within the scope of the invention and therefore their description is omitted.

Internal Configuration of the Constant Optimizer 60

Figure 2:
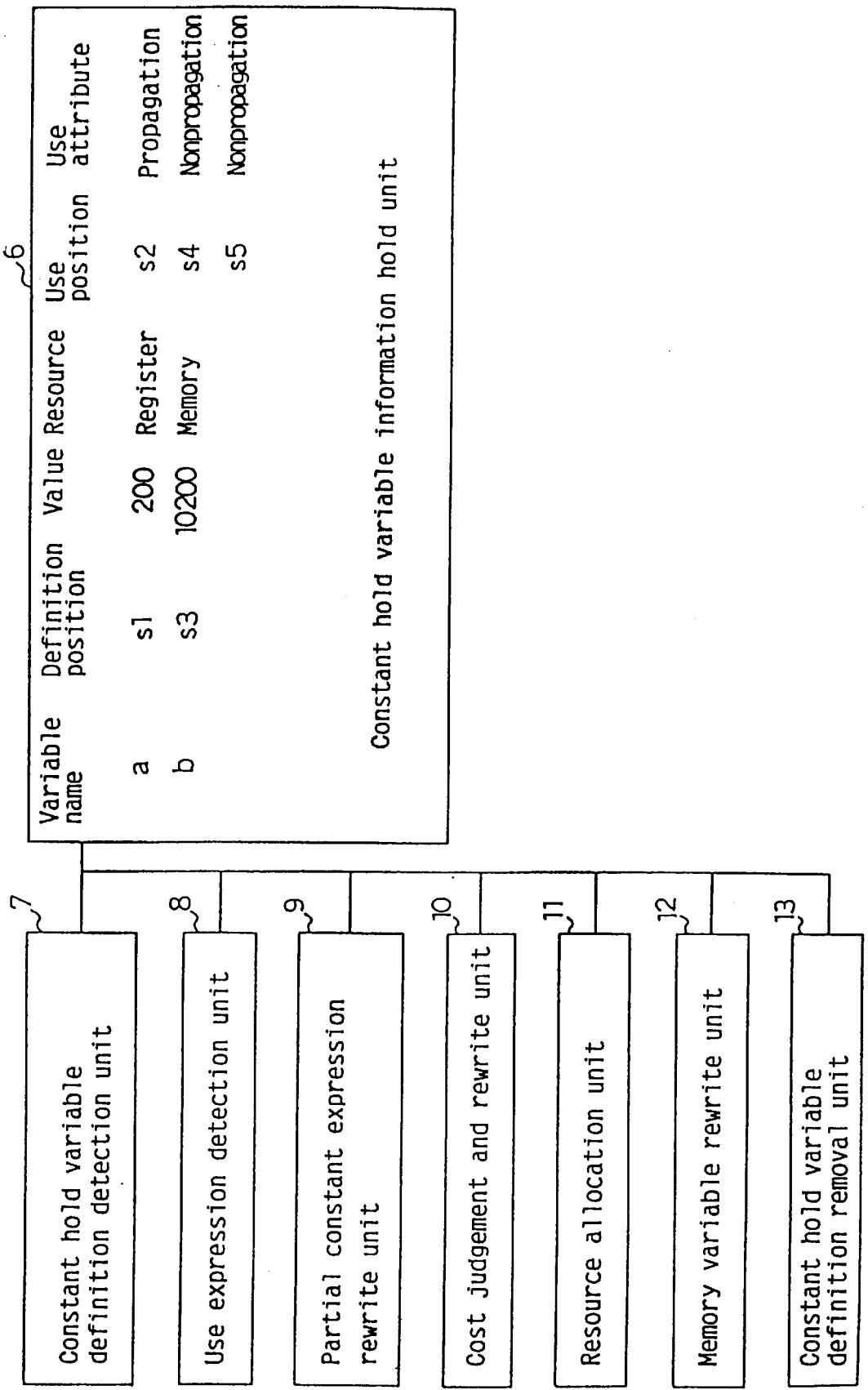
FIG. 2 is a diagram of the internal configuration of a constant optimizer 60 in the embodiment of the invention.

FIG. 2 is a diagram of the configuration of the constant optimizer 60. The constant optimizer 60 comprises a constant hold variable information hold unit 6, a constant hold variable definition detection unit 7, a use expression detection unit 8, a partial constant expression rewrite unit 9, a cost judgement and rewrite unit 10, a resource allocation unit 11, a memory variable rewrite unit 12, and a constant hold variable definition removal unit 13.

In the constant hold variable information hold unit 6, a data base of constant hold variable information held by a plurality of constant hold variables defined in the program is constructed. An example of constant hold variable information is shown in the frame in the figure indicating the constant hold variable information hold unit 6. Each constant hold variable information is configured by: the name of a constant hold variable; the position at which the constant hold variable is defined and which is indicated by means of position information in the program; a value held by the constant hold variable; a resource column indicating a resource to which the constant hold variable is allocated; the position at which the constant hold variable is used and which is indicated by means of position information in the program; and use attributes of use positions indicative of whether a hold value to be propagated to the respective use positions or not. In the figure, in the lateral direction as seen from a variable "a," sequentially arranged are "s1," "200," "register," "s2," and "propagation." This means that the definition position of the variable "a" is "s1," and the hold value of the variable "a" is "200." This means also that the variable "a" is allocated to a register and used at the position "s2," and the use attribute is substituted into "propagation."

In the lateral direction as seen from "b," "s3," sequentially arranged are "10200," "memory," "s4," and "nonpropagation." In the column below the arrangement, "s5" and "nonpropagation" are arranged. This means that the definition position of the variable "b" is "s3," and the hold value of the variable "b" is "10200." This means also that the variable "b" is allocated to a memory, and the use attribute at the position s4 is substituted into "nonpropagation." The arrangement of "s5" and "nonpropagation" in the lower column indicates that the variable "b" is used also at the position s5 in addition to the position s4, and the position s5 is "nonpropagation".

The position information described above is information which is provided for each of operation expressions, such as the example shown in FIGS. 13A to 13F, and corresponds to s1, s2, s3, s4, . . . in the figures.

The constant hold variable definition detection unit 7 detects from the program a substitution expression in which a constant or a constant expression is substituted into a variable, and checks the name of a constant hold variable which is defined in the detected substitution expression, the definition position of the constant hold variable, and the value held by the constant hold variable. The constant hold variable definition detection unit 7 then bundles these sets of information into one set of constant hold variable information, and registers the information in the data base of the constant hold variable information hold unit 6. A constant hold variable has been described above. A variable which is not a constant hold variable is a variable holding a value which is not uniquely determined by a substitution expression. For example, this value corresponds to a variable which stores a return value of a function, a variable which varies in value during execution of a program, etc. such as those described in the prior art example.

In the use expression detection unit 8, with respect to all constant hold variables held by the constant hold variable information hold unit 6, all operation expressions wherein the constant hold variable is positioned at an operand are detected from the program. The positions of the detected operation expressions are registered in the data base of the constant hold variable information hold unit 6, and the use attributes of the use positions are set to "nonpropagation".

In the partial constant expression rewrite unit 9, it is forecasted whether, when a constant hold variable used as an operand in the program is replaced with its hold value, an operation expression containing the operand becomes a constant or a constant expression or not. In view of the result of the data flow analysis, it is verified whether, even when the replacement is conducted, the dependence relationships between variables can be ensured or not. If, as a result of the series of the processes, it is forecasted that the replacement to the hold value causes the operation expression to become a constant or a constant expression and it is verified that the dependence relationships between variables can be held, the replacement is then executed. After the execution of the replacement, "propagation" is substituted into the use attribute of constant hold variable information held in the constant hold variable information hold unit 6, thereby causing a trace of the replacement to remain.

In the cost judgement and rewrite unit 10, with respect to a variable having a definition position which is held in the constant hold variable information hold unit 6, it is forecasted which is lower in cost the case where the use of the variable is replaced with the use of a constant or that where the variable is used as a register variable (which is a variable allocated to a register). Furthermore, it is verified from the result of the data flow analysis whether, even when the replacement is conducted, the dependence relationships between variables can be ensured or not. If, as a result of the series of the processes, it is forecasted that the replacement to a constant is lower in cost and it is verified that the dependence relationships between variables can be ensured, the replacement is then executed. "Propagation" is substituted into the use attribute of constant hold variable information held in the constant hold variable information hold unit 6, thereby causing a trace of the replacement to remain.

In the resource allocation unit 11, variables in the program are allocated to a memory or registers which are disposed in the micro processor of the target machine. Before the resource allocation, the resource allocation unit 11 checks the program which has undergone value propagation and folding, with respect to state of overlap of live ranges of the variables. Variables which overlap with each other are allocated to different registers. The resource allocation unit 11 further checks the nest level and the use frequency of each variable. Each variable is provided with priority on the basis of the results of the checks. In decreasing order of priority, variables are allocated to the registers. If there exist variables which cannot be allocated to registers, the variables are allocated to the memory. After conducting such resource allocation, particularly with respect to the constant hold variables, the resource allocation unit 11 reflects information indicating a register or the memory to which the constant hold variable is allocated, to the constant hold variable data base of the constant hold variable information hold unit 6.

In the memory variable rewrite unit 12, a constant hold variable which has been forecasted that the cost of the allocation to a register is lower, and verified that, even when the variable is rewritten to its hold value, the dependence relationships between variables can be ensured, and which has not been allocated to a register by the resource allocation unit 11 is rewritten to a constant which is the hold value. "Propagation" is substituted into the use attribute of the constant hold variable information held in the constant hold variable information hold unit 6, thereby causing a trace of the rewriting to remain.

In the constant hold variable definition removal unit 13, a constant hold variable held in the constant hold variable information hold unit 6 is checked. If the use attributes at all belonging to a constant hold variable are set to "propagation", the substitution expression defining the constant hold variable is removed away.

Figure 3:
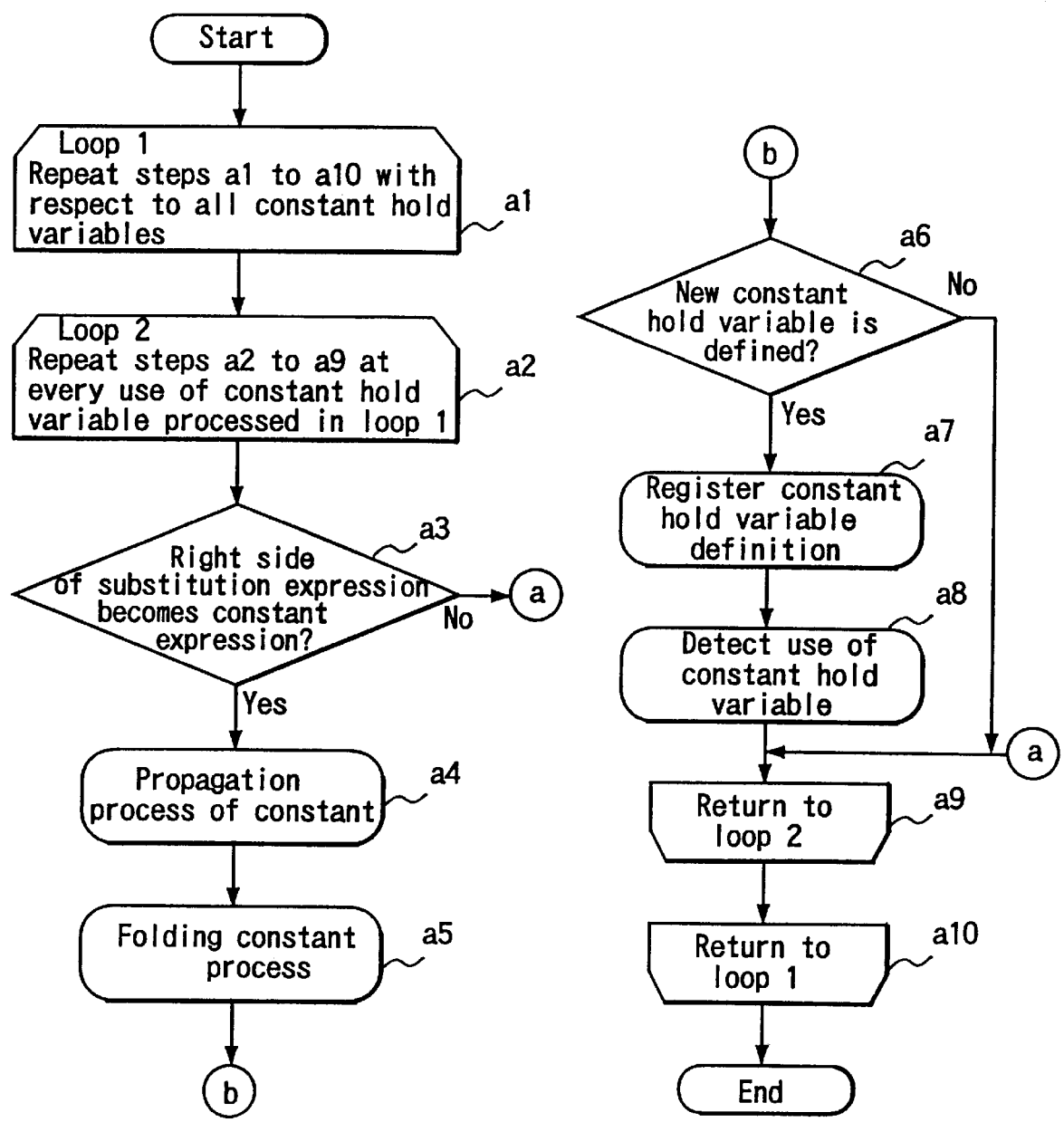
FIG. 3 is a flowchart showing the process of a partial constant expression rewrite unit 9.

FIG. 3 is a flowchart showing the process of the partial constant expression rewrite unit 9 shown in FIG. 2.

Step a1 cooperates with step a10 so that all the constant hold variables held in the constant hold variable information hold unit 6 are used one by one as the process object and the succeeding processes (steps a2 to a9) are repeated.

Step a2 cooperates with step a9 so that the succeeding processes (steps a3 to a8) are repeated for all the operation expressions wherein the constant hold variable which is currently processed in step a1 is contained as an operand.

In step a3, it is checked whether, when the currently processed constant hold variable is replaced with its hold value, an operation expression containing the constant hold variable becomes a constant expression or not. Specifically, in step a3, the constant hold variable is checked to see whether it is an operand of a unary operator or not, and whether it is an operand of a binary operator and the other operand is a constant or a constant hold variable or not. The unary operator means a substitution expression such as "a=−b" wherein there exist sole operator and sole operand.

In step a4, a constant hold variable at the position of an operand in the program is replaced with its hold vale (execution of constant propagation). The use attribute of the use position of constant hold variable information held in the constant hold variable information hold unit 6 is set to "propagation".

In step a5, it is checked whether, as a result of the replacement in step a4, a new constant expression appears in the program or not. The new constant expression in the program is folded into a constant.

In step a6, it is judged whether the expression (substitution expression) which is rewritten in steps a4 and a5 becomes the substitution expression defining the constant hold variable or not.

In step a7, with respect to the substitution expression defining the constant hold variable which is judged in step a6 to be coincident, the name, the definition position, and the hold value of the constant hold variable are bundled to be registered in the data base of the constant hold variable information hold unit 6.

In step a8, with respect to the constant hold variable which is registered in step a7 in the data base of the constant hold variable information hold unit 6, all operation expressions wherein the constant hold variable is positioned at an operand are detected from the program. The positions of the detected operation expressions are registered in the constant hold variable information hold unit 6, and the use attribute of the constant hold variable information is set to "nonpropagation".

As a result of the processes of steps a1 to a10, a state is obtained in which a constant hold variable which is an operand in the program is rewritten to its hold value and then convoluted.

Internal Configuration of the Cost Judgement and Rewrite Unit 10 Shown in FIG. 2

Figure 4A:
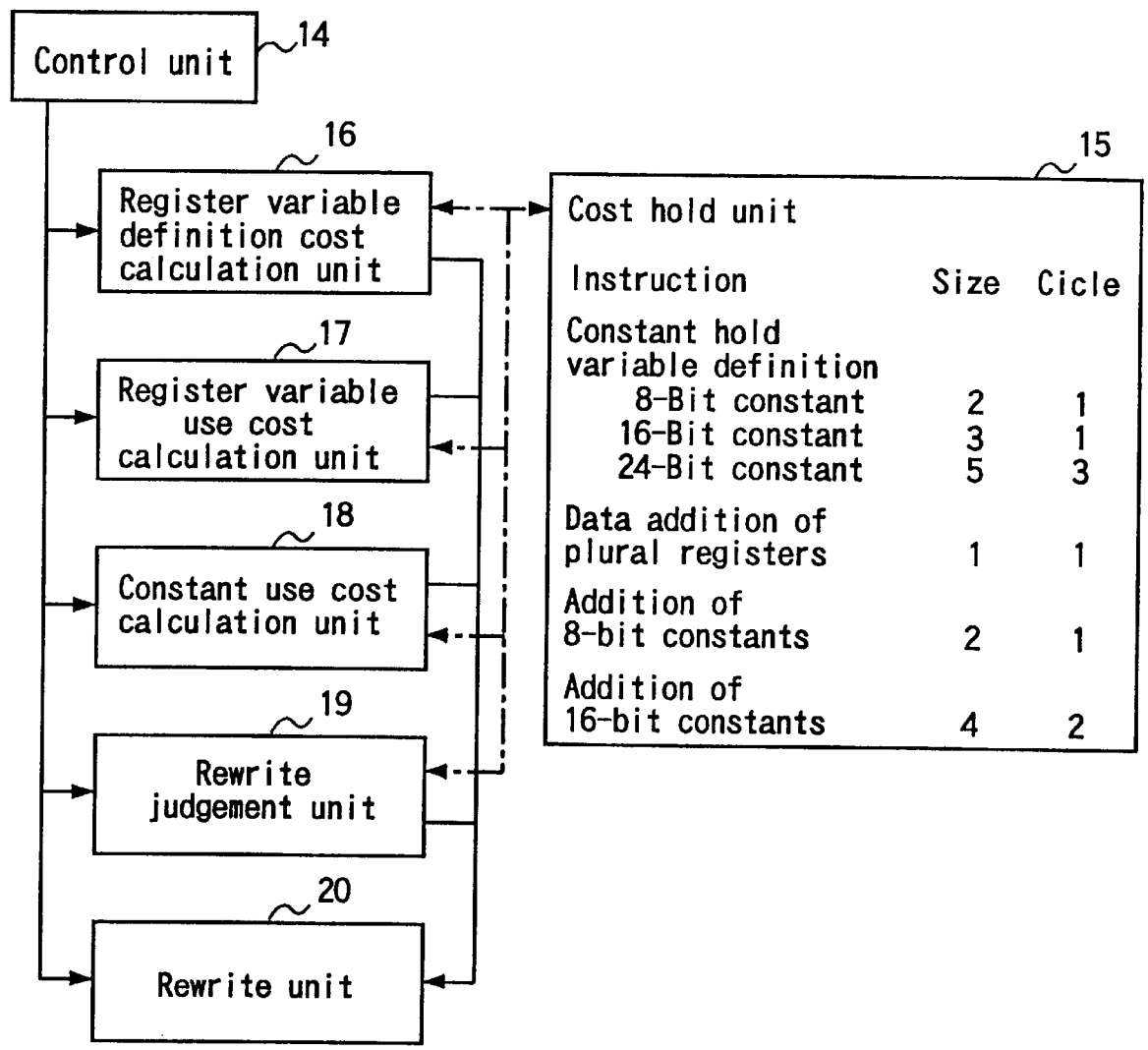
FIG. 4A is a diagram of the configuration of a cost judgement and rewrite unit 10.

FIG. 4A is a diagram of the internal configuration of the cost judgement and rewrite unit 10.

As shown in FIG. 4A, the cost judgement and rewrite unit 10 comprises a control unit 14, a cost hold unit 15 which holds information functioning as a clue for calculating the cost, a register variable definition cost calculation unit 16, a register variable use cost calculation unit 17, and a constant use cost calculation unit 18. The cost judgement and rewrite unit 10 further comprises a rewrite judgement unit 19 which judges on the basis of calculation results of these three calculation units whether a constant hold variable is to be rewritten or not, and a rewrite unit 20 which conducts the rewriting in accordance with the judgement result of the judgement unit.

Figure 6A:
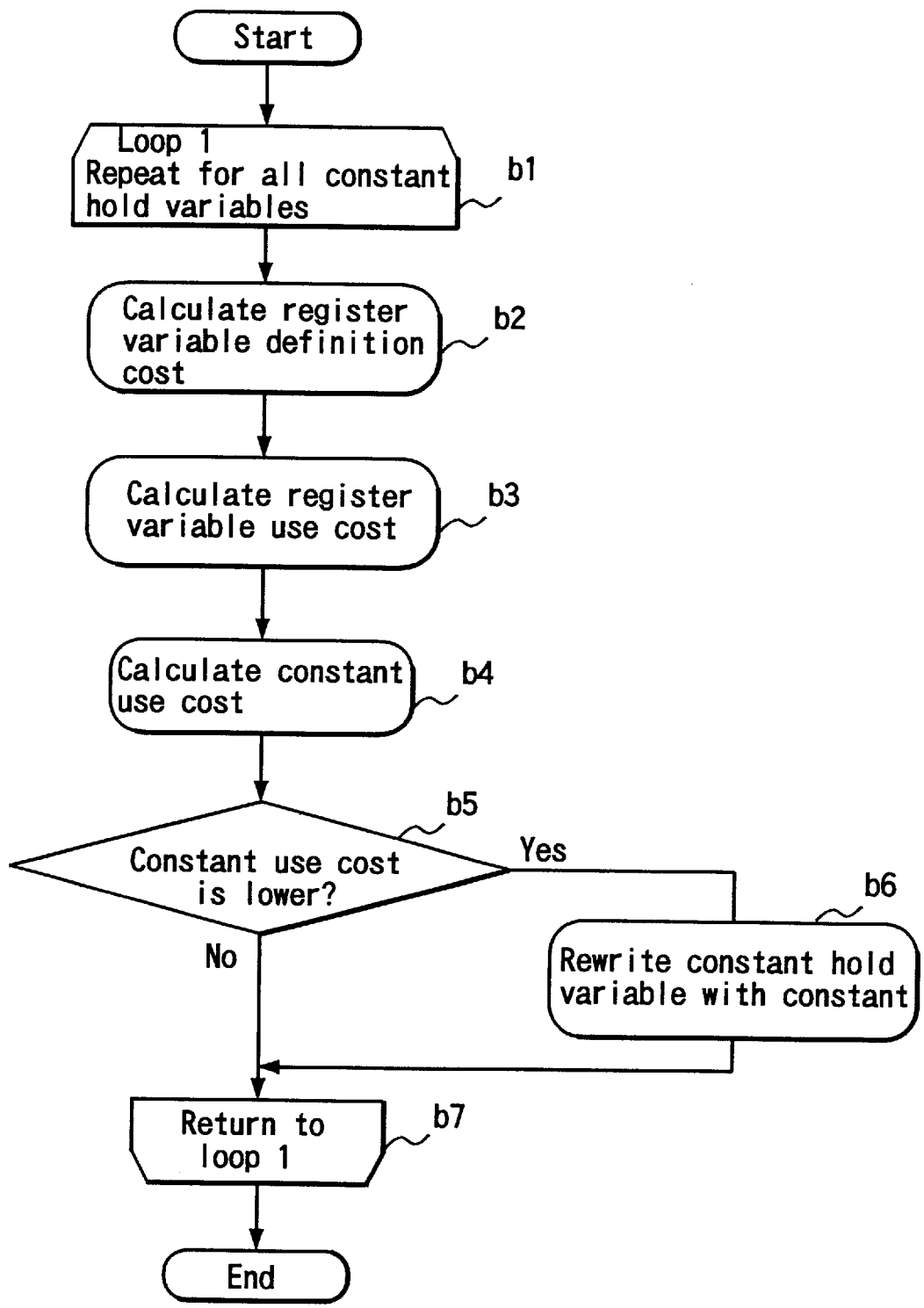
FIG. 6A is a flowchart showing the process of the cost judgement and rewrite unit 10, in the internal configuration of the constant optimizer 60.

The control unit 14 performs the process according to the flowchart of FIG. 6A.

FIG. 6A is a flowchart showing the procedure of the control unit 14.

Step b1 cooperates with step b7 so that the constant hold variables which are registered in the constant hold variable information hold unit 6 are processed one by one as the process object and the processes of steps b2 to b6 are repeated.

In step b2, with respect to the currently processed constant hold variable, data of the definition position of the constant hold variable are taken out from the constant hold variable information hold unit 6. The cost which should be consumed in a substitution expression located at the constant hold variable definition position, for taking out the substitution expression and defining the constant hold variable as a register variable (hereinafter, the cost is referred to as "register variable definition cost") is estimated.

In step b3, among the use positions of the currently processed constant hold variable, all use positions where the use attribute does not propagate are taken out from the constant hold variable information hold unit 6. The cost which should be consumed in an operation expression which contains a constant hold variable as an operand at the taken out use position, for taking out the operation expression and using the constant hold variable as a register variable (hereinafter, the cost is referred to as "register variable use cost") is estimated.

In step b4, among the use positions of the currently processed constant hold variable, all use positions where the use attribute is "nonpropagation" are taken out from the constant hold variable information hold unit 6. The cost which should be consumed in an operation expression which contains a constant hold variable as an operand at the use position, for taking out the operation expression and using the constant hold variable with replacing it to a constant (hereinafter, the cost is referred to as "constant use cost") is estimated.

In step b5, from the costs calculated in steps b2 to b4, the sum of the register variable definition cost and the register variable use cost is calculated, and the sum is compared with the constant use cost.

If the constant use cost is lower than or equal to the sum in step b5, the operation of step b6 is performed. In this case, the cost of replacing the constant hold variable with a constant is lower as a whole, and hence the use positions of the currently processed constant hold variable are taken out from the constant hold variable information hold unit 6. Furthermore, an operation expression which contains the constant hold variable as an operand at each of the constant hold variable use positions is taken out. The use of the constant hold variable which is an operand of the operation expression is replaced with that of a constant which is the hold value. The use attribute of the use position is set to "propagation".

As a result of the processes of steps b1 to b7, a state is obtained in which, among constant hold variables in the program, ones wherein the use as a register consumes a lower cost are replaced with register variables, and the other ones are replaced with a constant which is the value of the constant hold variable.

The cost hold unit 15 shown in FIG. 4A holds all patterns which indicate typical examples of a machine language code for performing definition and use and costs which are to be consumed in the patterns, with associating the patterns and the costs with each other. FIG. 5 shows a series of contents held in the cost hold unit 15. In FIG. 5, "instruction," "size," and "cycle" are laterally arranged in the frame indicating the cost hold unit 15. Below "instruction," downward arranged are "constant hold variable definition," "8-bit constant," "16-bit constant," and "24-bit constant." On the lateral side of "8-bit constant," arranged are "2" and "1." These mean that, when a constant hold variable of an 8-bit length is defined, a memory size of "2" is consumed and "1" execute cycle is consumed in an operation expression containing the constant hold variable. On the lateral side of "24-bit constant," arranged are "5" and "3." These mean that, when a constant hold variable of a 24-bit length is defined, a memory size of "5" is consumed and "3" execute cycles are consumed in an operation expression containing the constant hold variable.

On the lateral side of "Addition of register variable— constant 8-bit," arranged are "2" and "1." These mean that, when a constant hold variable holding a constant of an 8-bit length is used as a constant in an addition, a memory size of "2" is consumed and "1" execute cycle is consumed in an operation expression performing the use. On the lateral side of "addition of register variable—constant 16-bit," arranged are "4" and "2." These mean that, when a constant hold variable holding a constant of a 16-bit length is used as a constant in an addition, a memory size of "4" is consumed and "2" execute cycles are consumed in an operation expression performing the use.

In addition to "constant hold variable definition" and "addition of register variable—constant 8-bit," there are "addition of register variables," "load from memory," "store into memory," etc. in the figure. The cost hold unit 15 holds also costs which are consumed by these instructions, so that costs can be calculated for all the expressions contained in the program. Content of the cost hold unit 15 is decided by an instruction set of the processor which is a target of the compiler. An example of a part of the instruction set is illustrated at a lower portion of FIG. 5. The content of the cost hold unit 15 illustrated at an upper portion of FIG. 5 is decided on the basis of the instruction set. Referring to FIG. 5, expression "#imm8" represents a constant which can be represented by 8 bits. Expressions "Dn" and "reg" represent registers. Expression "@mem" represents a memory.

The register variable definition cost calculation unit 16 performs the inference in step b2. Specifically, the cost hold unit 15 is retrieved by a substitution expression which defines a constant hold variable, a cost matching the substitution expression is taken out, and the cost is used as an inference result.

The register variable use cost calculation unit 17 performs the inference in step b3. Specifically, a constant hold valuable use position at which the use attribute is "nonpropagation" is taken out. The cost hold unit 15 is subjected to retrieval by using as the retrieval item an operation expression which contains a constant hold variable as an operand at the use position. Costs matching the retrieval item are taken out, the taken out costs are accumulated, and the accumulation is used as an inference result.

The constant use cost calculation unit 18 is activated in step b4 and conducts retrieval on the cost hold unit 15 with respect to an operation expression which contains a constant hold variable as an operand at a constant hold variable use position where the use attribute is "nonpropagation", by using as the retrieval item an operation expression wherein a constant hold variable is replaced with a constant held by the variable. Costs matching the retrieval item are taken out, the taken out costs are accumulated, and the accumulation is used as an inference result.

The rewrite judgement unit 19 is activated in step b5, and receives the register variable definition cost from the register variable definition cost calculation unit 16 and the register variable use cost from the register variable use cost calculation unit 17. The rewrite judgement unit 19 further receives the constant use cost from the constant use cost calculation unit 18 and calculates the sum of the register variable definition cost and the register variable use cost. Then, the sum is compared with the constant use cost. If the constant use cost is lower than or equal to the sum, the cost of rewriting the constant hold variable with the hold value is lower as a whole. Therefore, the rewrite unit 20 is called so that the constant hold variable is rewritten to the constant. If the constant use cost is higher, the cost of changing the constant hold variable to a register variable is lower as a whole, and hence the rewriting is not conducted.

The rewrite unit 20 takes out the use positions of the currently processed constant hold variable from the constant hold variable information hold unit 6, and also operation expressions which contain the constant hold variable as an operand at the constant hold variable use positions. The use of the constant hold variable in the program is replaced with the use of the hold value, and the use attribute of each use position is set to "propagation."

Internal Configuration of the Memory Variable Rewrite Unit 12 Shown in FIG. 2

Figure 4B:
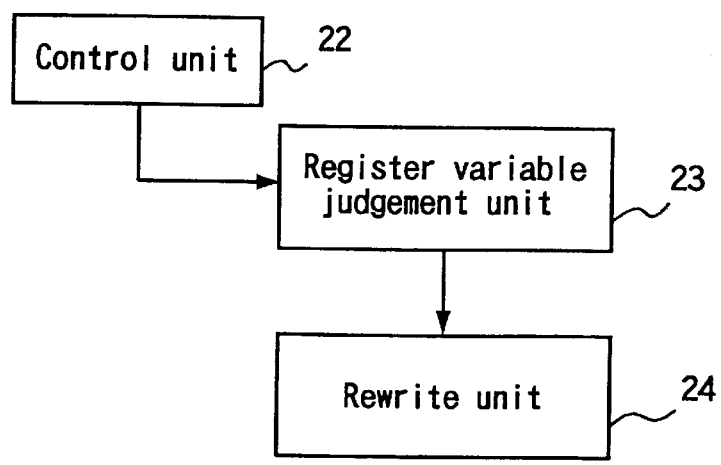
FIG. 4B is a diagram of the configuration of a memory variable rewrite unit 12.

FIG. 4B is a diagram of the internal configuration of the memory variable rewrite unit 12.

The memory variable rewrite unit 12 comprises a control unit 22, a register variable judgement unit 23, and a rewrite unit 24.

For each of the constant hold variables held in the constant hold variable information hold unit 6, the control unit 22 calls the register variable judgement unit 23.

Figure 6B:
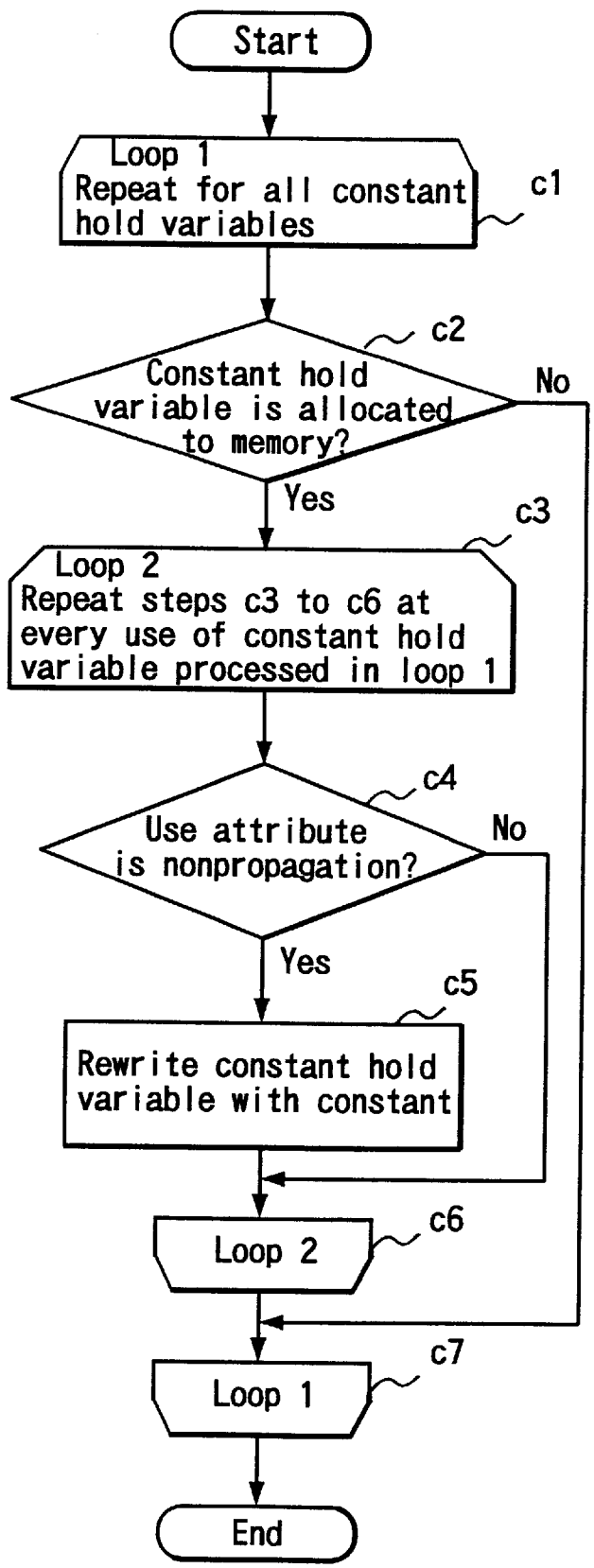
FIG. 6B is a flowchart showing the process of the memory variable rewrite unit 12, in the internal configuration of the constant optimizer 60.

FIG. 6B is a flowchart showing the procedure of the control unit 22 shown in FIG. 4B.

Step c1 cooperates with step c7 so that the succeeding processes (steps c2 to c6) are repeated for all the constant hold variables registered in the constant hold variable information hold unit 6.

In step c2, with respect to the currently processed constant hold variable, a resource to which the variable is allocated is taken out from the constant hold variable information hold unit 6, and it is judged whether the variable is allocated to the memory or not.

Step c3 cooperates with step c6 so that, with respect to the constant hold variable which is judged in step c2 to be allocated to the memory, the use of the constant hold variable is taken out from the constant hold variable information hold unit. Thereafter, the succeeding processes (steps c4 and c5) are repeated for all the uses of the constant hold variable.

In step c4, with respect to the use of the currently processed constant hold variable, the use attribute of the variable is taken out from the constant hold variable information hold unit 6, and it is judged whether the use attribute is "nonpropagation" or not.

In step c5, with respect to the use of the constant hold variable which is judged in step c2 to be allocated to the memory and in which the use attribute is judged in step c4 to be "nonpropagation", the use position is taken out from the constant hold variable information hold unit 6. The constant hold variable which is used as an operand at the use position is replaced with a constant value which is its hold value and the use attribute is set to "propagation".

As a result of the processes of steps c1 to c7, a state is obtained in which, among constant hold variables in the program, ones which are allocated to the memory as a result of the resource allocation are replaced with hold values.

The register variable judgement unit 23 takes out the use attribute of the currently processed constant hold variable from the constant hold variable information hold unit 6. On the basis of the resource column of the constant hold variable information hold unit 6, it is judged whether the variable is allocated to a register or the memory. If it is judged that the variable is allocated to the memory, it is further judged whether the use attribute of the variable is "nonpropagation" or not. If the use attribute is "nonpropagation", the rewrite unit 24 is activated.

The rewrite unit 24 is activated by the register variable judgement unit 23 and takes out all use positions of the currently processed constant hold variable from the constant hold variable information hold unit 6. The constant hold variable which is positioned at an operand at each of the taken out positions is rewritten to its hold value, and the use attribute of the use position of the constant hold variable is set to "propagation".

Example of an Operation in Which the Intermediate Language Program of FIGS. 7A to 7F is used as the Process Object Hereinafter, an operation conducted when the program shown in FIG. 7A is supplied as an input to the thus configured optimizer will be described as an operation example.

(1) The constant hold variable definition detection unit 7 detects a definition expression (a substitution expression setting a constant to a constant hold variable) at the position s1 in the program of FIG. 7A. The constant hold variable definition detection unit 7 then bundles the name a of the detected constant hold variable, the definition position s1, and the constant hold variable value 200, into one set of constant hold variable information, and registers the information in the data base of the constant hold variable information hold unit 6.

(2) The use expression detection unit 8 searches from the program, a use expression of the constant hold variable "a" registered in the constant hold variable information hold unit 6, and detects the use expression of the constant hold variable "a" at the position s2. The use expression detection unit 8 bundles the detected use position s2 and the use attribute "nonpropagation" into one set of constant hold variable information, and registers the information in the data base of the constant hold variable information hold unit 6. Similarly, the use expression detection unit 8 searches the use of the constant hold variable "a" and detects the operation expression at the position s3. The use expression detection unit 8 writes "nonpropagation" as the use attribute into the column of the constant hold variable "a" of the constant hold variable information hold unit 6. At this stage, information held in the constant hold variable information hold unit 6 is as shown in FIG. 8A.

(3) In the partial constant expression rewrite unit 9, the loop of steps a1 to a10 is repeated for each of the constant hold variables of the constant hold variable information hold unit 6. At this stage, the unit holds only the constant hold variable "a". Therefore, the loop of steps a1 to a10 is executed for the constant hold variable "a".

The loop of steps a2 to a9 is repeatedly executed for each of use expressions (substitution expressions wherein the constant hold variable is an operand) of the constant hold variable "a" of the constant hold variable information hold unit 6. In this example, since two position information sets or the positions s2 and s3 are stored in the constant hold variable information of the constant hold variable "a", the loop is executed two times.

In step a3, it is judged whether the use of the constant hold variable held in the constant hold variable information hold unit 6 can be held into a constant. The expressions after the use expression of the constant hold variable "a" is replaced with a constant 200 are "a1=(200)+x" at the position s2 and "b=10000+(200)" at the position s3 (where a value in { } indicates a constant generated by the rewriting). Namely, only in the operation expression at the position s3, the result can be held into a constant. Hereinafter, therefore, the processes of steps a4 to a8 are executed only on the operation expression of the constant hold variable at the position s3.

In step a4, the position s3 in the program is rewritten to "b=10000+{200}" (constant propagation), and the use attribute of the column containing the position s3 of the constant hold variable "a" in the constant hold variable information hold unit 6 is set to "propagation."

In step a5, the position s3 in the program is further convoluted into "b={10200}."

In step a6, it is judged whether a definition expression of a constant hold variable has been newly generated as a result of the rewriting in step a5 or not. In this case, a constant hold variable "b" has been newly generated by the substitution expression "b={10200}," and hence steps a7 and a8 are thereafter executed.

In step a7, as constant hold variable information with respect to the definition expression which is judged in step a6 to be newly generated, the constant hold variable name "b" and the constant hold variable definition position s3 are bundled into one set. As the one set of constant hold variable information, the constant hold variable value 10200 is registered in the data base of the constant hold variable information hold unit 6.

In step a8, with respect to the constant hold variable "b"which is newly stored in step a7, its use position is searched in the program. The process is conducted in the same manner as (2) above and hence its description is omitted.

Step a9 cooperates with step a2 so as to conduct a loop process.

Step a10 cooperates with step a1 so as to conduct a loop process. At this stage, also the definition expression of the constant hold variable "b" is registered in the constant hold variable information hold unit 6. Therefore, the process returns to step a1 so that the loop process is conducted. In other words, with respect to all the definition expressions of the constant hold variable "b" including those which are added in the way, the processes of steps al to a10 are repeated. @71 As a result of the rewriting of the partial constant expression rewrite unit 9, the intermediate language program becomes as shown FIG. 7B, and the constant hold variable information held in the constant hold variable information hold unit 6 becomes as shown FIG. 8B.

(4) The cost judgement and rewrite unit 10 executes the following process on the constant hold variables "a" and "b" held in the constant hold variable information hold unit 6. It is assumed that the instruction set shown in FIG. 9 is used as that of the micro processor. In this case, information stored in the cost hold unit 15 becomes as shown in FIG. 10.

Cost Comparison and Rewriting of the use of the Constant Hold Variable "a"

The register variable definition cost calculation unit 16 takes out the definition position of the constant hold variable "a" from the constant hold variable information hold unit 6, and the definition expression of the constant hold variable "a" from the program. The unit 16 checks the matching of the position and the expression with the patterns stored in the cost hold unit 15, and takes out the definition cost of the constant hold variable "a". In this case, since 200 is a constant which is not larger than 8 bits, size 2 and cycle 1 are taken out as the cost (step b2 and an arrow c1 of FIG. 10).

The register variable use cost calculation unit 17 takes out the use position of the use where the use attribute is "nonpropagation", among the uses of the constant hold variable "a", from the constant hold variable information hold unit 6, and the use expression of the constant hold variable "a" at the use position. The unit 17 checks the matching of the position and the expression with the patterns stored in the cost hold unit 15, and takes out the use cost data of the constant hold variable "a". In this case, match an addition of register variables, and size 1 and cycle 1 are taken out as the cost (step b3 and an arrow c2 of FIG. 10).

The constant use cost calculation unit 18 takes out the use position of the use where the use attribute is "nonpropagation", among the uses of the constant hold variable "a", from the constant hold variable information hold unit 6, and the use expression from the program. The unit 18 checks the matching of a constant expression wherein the constant hold variable in the use expression is replaced with its hold value, with the patterns stored in the cost hold unit 15, and takes out the use cost in the case where the constant hold variable "a" is replaced with a constant. In this example, the expression matches an addition of register variable—8-bit constant, and size 2 and cycle 1 are taken out as the cost (step b4 and an arrow c3 of FIG. 10).

The rewrite judgement unit 19 calculates the sum of the cost calculated in the register variable definition cost calculation unit 16 and that calculated in the register variable use cost calculation unit 17. The sum is compared with the cost calculated in the constant use cost calculation unit 18 (step b5). In the example of the constant hold variable "a", when used as a register variable, size=2+1=3
cycle=1+1=2, when replaced with a constant, size=2
cycle=1.

Namely, the constant use cost is lower. Therefore, the rewrite unit 20 is activated so that the use expression of the constant hold variable "a" which is used as an operand of the operation expression at the position s2 is rewritten with the constant hold variable value 200 (step b5). As a result, the substitution expression at the use position s2 becomes "a1=200+x."

Cost Comparison and Rewriting for the Constant Hold Variable "b"

The process is conducted in a similar manner as the case of the constant hold variable "a". In the case of the constant hold variable "b", however, the constant use cost is higher. Therefore, the rewrite unit 20 is not activated.

As a result of the process of the cost judgement and rewrite unit 10, the program becomes as shown in FIG. 7C and the information held in the constant hold variable information hold unit 6 becomes as shown in FIG. 8C.

(5) The resource allocation unit allocates the variables "a", "a1" "b", "b1", "b2", and "y" to the registers or the memory. As to the variables "a" and "b" which are constant hold variables, the resources (registers or the memory) allocated in the resource column of the constant hold variable information hold unit 6 are set.

(6) The memory variable rewrite unit 12 checks a constant hold variable held in the constant hold variable information hold unit 6 to see whether the constant hold variable is allocated to a register or not (step c2).

[The case where the constant hold variable "b" is allocated to a register]

In the case where a constant hold variable is allocated to a register, the process is terminated. In the example, since the constant hold variable "b" is allocated to a register, the program becomes as shown in FIG. 7C.

(8) If all the use attributes of a constant hold variable held in the constant hold variable information hold unit 6 are "propagation", the constant hold variable definition detection unit 7 removes the definition expression of the constant hold variable from the program, on the basis of the contents of the section of the constant hold variable definition position registered in the constant hold variable information hold unit 6.

In the example, if the constant hold variable "b" is allocated to a register, the information in the constant hold variable information hold unit is as shown in FIG. 8D and only the constant hold variable "a" can be subjected to removal of a definition expression. In this case, therefore, the definition expression (the position s1 in the program) of the constant hold variable "a" is removed, with the result that the program is finally rewritten as shown in FIG. 7E.

[The case where the constant hold variable "b" is not allocated to a register]

In the case where the constant hold variable "b" is not allocated to a register, the attribute section of the constant hold variable information is further checked to see whether the use attribute is "nonpropagation" or not (step c4). In this example, as shown in FIG. 8C, the use attributes at the use positions s4 and s5 are "nonpropagation". Therefore, the rewrite unit 24 is activated so that the use of the constant hold variable is rewritten to the use of its hold value (step c5). In the example, since the constant hold variable "b" is not allocated to a register, the program is rewritten as shown in FIG. 7D. In the case where the constant hold variable "b" is not allocated to a register, the information in the constant hold variable information hold unit is as shown in FIG. 8E and constant hold variables which can be subjected to removal of a definition expression are a and b. In this case, therefore, the definition expression (the position s1 in the program) of the constant hold variable "a" and the definition expression (the position s3 in the program) of the constant hold variable "b" are removed, with the result that the program is finally rewritten as shown in FIG. 7F.

Example of an Operation in Which the Intermediate Language Program of FIG. 11A is used as the Process Object Hereinafter, the operation conducted when the program shown in FIG. 111A is supplied as an input to the optimizer will be described with reference to FIGS. 2 and 3.

(1) The constant hold variable definition detection unit 7 detects a substitution expression of a constant hold variable indicated by 31 at the position s1 in the program, and registers the constant hold variable name a, the definition position s1, and the constant hold variable value 1000, in the data base of the constant hold variable information hold unit 6 (step a7).

(2) The use expression detection unit 8 searches from the program, a use position of the constant hold variable "a" held in the constant hold variable information hold unit 6, and detects the use expression at the position s2. The unit 8 registers the use position s2 and the use attribute "nonpropagation" in the column of the constant hold variable "a" of the constant hold variable information hold unit 6. Similarly, the use expressions of the constant hold variable "a" at s3 and s4 are detected, and the use attributes of the use positions s3 and s4 are set to "nonpropagation" (step a8).

(3) In the partial constant expression rewrite unit 9, since the use s4 of the constant hold variable "a" satisfies the rewrite conditions, the use s4 is rewritten to "b=20000+10000" and then to "b=30000" as shown in FIG. 11B. In the constant hold variable information hold unit 6, the use attribute of the use position s3 of the constant hold variable "a" is set to "propagation" (step a5). At this stage, also the constant hold variable "b" becomes a new constant hold variable and is registered. In this example, however, the description of the use expression of the variable "b" is omitted and only the variable "a" will be described.

(4) The cost judgement and rewrite unit 10 executes the following process on the constant hold variable "a" held in the constant hold variable information hold unit 6. It is assumed that the instruction set shown in FIG. 9 is used as that of the micro processor. In this case, information stored in the cost hold unit 15 becomes as shown in FIG. 10.

In the register variable definition cost calculation unit 16, the definition position of the constant hold variable "a" is taken out from the constant hold variable information hold unit 6, and the definition expression from the program. The unit 16 checks the matching of the position and the expression with the patterns stored in the cost hold unit 15, and takes out the definition cost of the constant hold variable "a". In this case, since 10000 is a constant which is not larger than 16 bits, size 3 and cycle 1 are taken out as the cost (step b2).

In the register variable use cost calculation unit 17, a use position where the use attribute is "nonpropagation", among the use positions of the constant hold variable "a", is taken out from the constant hold variable information hold unit 6, and the use expression from the program. The unit 17 checks the matching of the position and the expression with the patterns stored in the cost hold unit 15, and takes out the use cost of the constant hold variable "a". In this case, both (s2 and s3) match an addition of register variables, and size 1 and cycle 1 are taken out as the cost (step b3).

In the constant use cost calculation unit 18, the use position of the constant hold variable "a" is taken out from the constant hold variable information hold unit 6, and, among use expressions at the use positions, an expression where the use attribute is "nonpropagation" is taken out. The unit 18 checks the matching of a constant expression wherein the constant hold variable in the use expression is replaced with its hold value, with the patterns stored in the cost hold unit 15, and takes out the use cost in the case where the constant hold variable "a" is replaced with the hold value. In this example, both match an addition of a register variable and a 16-bit constant, and size 4 and cycle 2 are taken out as the cost (step b4).

In the rewrite judgement unit 19, the sum of the cost calculated in the register variable definition cost calculation unit 16 and the cost calculated in the register variable use cost calculation unit 17 is calculated. The sum is compared with the cost calculated in the constant use cost calculation unit 18 (step b5). In the example of the constant hold variable "a", when used as a register variable, size=3+1+1=5
cycle=1+1+1=3, when replaced with a constant, size=4+4=8
cycle=2+2=4.

Namely, the cost in the case where the variable is used as a register variable is lower. Therefore, the rewrite unit 20 is not activated and the positions s2 and s3 remain unchanged.

Therefore, the intermediate language program of FIG. 11A is changed so as to have the form of FIG. 11B. In FIG. 11B, the substitution expression at the position s4 becomes "b=30000," the substitution expression "b=30000" appears in the program, and the variable "b" of the substitution expression at the position s4 becomes a new constant hold variable.

When the new constant hold variable appears as a result of the "propagation" and constant folding, in the same manner as the case of the constant hold variable "a", an operation expression wherein the constant hold variable "b" is an operand is searched. Three arrows elongate from the variable "b", and respectively terminate at other variables "b". The arrows indicate operation expressions wherein the variable "b" is used as an operand. The optimizer detects operation expressions at the positions s9 and s10, and rewrites the constant hold variable "b" which is used in the operation expressions as an operand, to its hold value "30000." As a result of this rewriting, the operation expressions at the positions s9 and s10 are respectively rewritten to "u=10000+(30000)" and "z=(30000)+45000," as shown in the figure. After this rewriting, the optimizer conducts constant folding so that the substitution expressions at the positions s9 and s10 are rewritten to "u=40000" and "z=75000," respectively. This rewriting causes the variables "u" and "z" to become a constant hold variable. Therefore, the optimizer further repeats "propagation" and folding on the variables. When "propagation" and folding are repeated in this way, the substitution expressions at the positions s4, s9, and s10 are deleted as the program so that the program becomes very simple.

As described above, after rewriting, the optimizer conducts constant propagation and constant folding. Thereafter, the optimizer allocates variables remaining in the program to registers or a memory. In the resource allocation, the optimizer allocates variables having live ranges which overlap with each other, to different registers.

It is assumed that the variables "a", "x", and "y" in the program which is rewritten as shown in FIG. 11F by constant propagation and constant folding are allocated to registers D0, D1, and D2, respectively. Since the variables "a", "x", and "y" are allocated to registers, the substitution expressions in the program shown in FIG. 11F are converted into machine language codes wherein an operand is a register.

FIG. 12 shows machine language codes which are generated from the intermediate language program at the positions sl to s3 in FIG. 11F. In the figure, "movi #10000, D0," "add D0, D1," and "add D0, D2" correspond to the substitution expressions of the intermediate language program after optimization. On the right side of the machine language codes, memory sizes and execute cycles are written. In the machine language codes, an operand is set to a register, and hence "add D0, D1" has a memory size of "1" and an execute cycle of "1," and "add D0, D2" has a memory size of "1" and an execute cycle of "1." If the machine language codes contain an immediate value "#10000" as in the case of the prior art example, they have a memory size of "4" and an execute cycle of "4" as shown in FIG. 14. Accordingly, it will be seen that "propagation" of the present invention can conduct the rewriting to a machine language program of a lower cost.

As described above, according to the invention, constant propagation and constant folding are effectively conducted, and the cost increase due to constant propagation can be prevented from occurring.

In the embodiment, both the size and the running time (the number of cycles) of an instruction are used in parallel as costs. When a code of a size which is particularly small or of a short running time is to be obtained as a generated code, the setting may be conducted so that priorities are assigned to costs. Specifically, when a higher priority is to be assigned to the code size, the code size is first used as a cost, and, in the case where codes of the same size are used, the cycle numbers are compared with each other. When a higher priority is to be assigned to the running speed, the cycle number is first used as a cost, and, in the case where codes of the same cycle number are used, comparison of the code sizes is conducted. Alternatively, either of the code size and the cycle number may be singly used. It is a matter of course that a value which is obtained by performing an operation on such information may be used as a cost.

As described above, according to the optimizer of the invention, a program can be simplified by rewriting of the first rewrite means. Since the rewriting of other expressions is conducted only when the estimation result of the first estimation means is not higher than the estimation result of the second estimation means, the cost increase due to constant propagation can be prevented from occurring. When cost propagation is conducted without causing the cost increase in this way, redundant portions are eliminated from the program. Therefore, the machine language program which is generated on the basis of the program is very high efficient.

Furthermore, in addition to the above-mentioned effects, the optimizer of the invention can attain the following effects.

Since an expression wherein all operands are made constants is rewritten to a constant which is an operation result of the constant expression and the rewritten expression is managed by the management means, a constant hold variable can be newly generated by the rewriting of the first and second rewrite means, and a constant held by a constant hold variable can be propagated. When these processes are repeated and "propagation" and folding are sequentially conducted, many expressions are deleted from the program so that the program is very simple. Consequently, the running time and the memory size of a finally prepared machine language program can be largely reduced.

Furthermore, in addition to the above-mentioned effects, the optimizer of the invention can attain the following effects.

Resource allocation is conducted on variables of the program in which expressions are deleted by the first, second, and fourth rewrite means. Among constant hold variables allocated to the memory as a result of the resource allocation, a constant hold variable is caused not to be allocated to the memory, and rewritten to a constant. With respect to expressions wherein the constant hold variable is an operand and those wherein a constant is substituted, therefore, it is not required to conduct a memory access. Consequently, the running time can be shortened by a time corresponding to the memory access.

Furthermore, in addition to the above-mentioned effects, the optimizer of the invention can attain the following effects.

Since expressions in a related expression set are replaced with machine language instructions and estimation is conducted by estimating the costs of the machine language instructions in the unit of a related expression set, the costs can be estimated more correctly. Consequently, the judgement on whether an operand is to be rewritten or not can be performed more correctly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An optimizer which is disposed in a compiler for compiling a program written in a programming language to a machine language program or assembler program, and optimizes a program written in a programming language and outputs an optimized program, comprising:

management means for managing a constant hold variable which is a variable into which a constant in the program is to be substituted, as a related expression set of the constant hold variable, by associating an expression wherein a constant is substituted into the constant hold variable with an expression wherein the constant hold variable is an operand;

first rewrite means for rewriting, among expressions in the related expression set wherein a constant hold variable is an operand, an expression wherein any other operand is a constant, and an expression of unary operation wherein the constant hold variable is an operand, to an expression wherein a constant held by the constant hold variable is an operand;

first estimation means for, after rewriting of said first rewrite means is conducted, when a constant hold variable which has not been rewritten to a constant is replaced with a constant immediate data held by the constant hold variable and set as an operand of a machine language operation, estimating an execute cycle and/or a code size of machine language instructions generated from an expression wherein the constant hold variable is an operand, in a related expression set of the constant hold variable, on the basis of a byte length of the constant;

second estimation means for, after rewriting of said first rewrite means is conducted, when a register storing a constant held by a constant hold variable which has not been rewritten to a constant is set as an operand of a machine language operation, estimating an execute cycle and/or a code size of machine language instructions generated from an expression wherein a constant is substituted into the constant hold variable and an expression wherein the constant hold variable is an operand, in a related expression set of the constant hold variable;

comparison means for comparing an estimation result of said first estimation means with an estimation result of said second estimation means, for each related expression set;

second rewrite means for, in a related expression set wherein, as a result of comparison of said comparison means, the estimation result of said first estimation means is not more than the estimation result of said second estimation means, rewriting any constant hold variable used as anoperand to a constant held by the constant hold variable; and third rewrite means for, when any expression wherein a constant hold variable is used as an operand is rewritten to an expression wherein a constant held by a constant hold variable is used as an operand, deleting an expression wherein a constant is substituted into the constant hold variable.

2. An optimizer in accordance with claim 1, wherein said optimizer further comprises:

fourth rewrite means for rewriting an expression wherein any operand is made a constant by rewriting conducted by said first and second rewrite means, to a constant which is an operation result of a constant expression;

control means for causing the new constant hold variable into which the operation result is to be substituted in the expression generated by rewriting conducted by said fourth rewrite means, an expression wherein a constant is substituted into the constant hold variable, and any expression wherein the constant hold variable is used as an operand, to be managed as a related expression set of the constant hold variable by said management means; and activation means for activating said first rewrite means for a related expression set which is newly managed by said management means.

3. An optimizer in accordance with claim 1, wherein said optimizer further comprises:

resource allocation means for, after rewriting conducted by said second rewrite means, allocating variables in the program to registers or a memory, on the basis of an overlap state of live ranges of the variables and a use frequency of each variable; and fifth rewrite means for conducting a judgement of a constant hold variable on the variables which are allocated to the memory by said resource allocation means, and rewriting any constant hold variable which is an operand in a related expression set of a judged constant hold variable, to the constant.

4. An optimizer in accordance with claim 2, wherein said optimizer further comprises:

resource allocation means for, after rewriting conducted by said second rewrite means, allocating variables in the program to registers or a memory, on the basis of an overlap state of live ranges of the variables and a use frequency of each variable; and fifth rewrite means for conducting a judgement of a constant hold variable on the variables which are allocated to the memory by said resource allocation means, and rewriting any constant hold variable which is an operand in a related expression set of a judged constant hold variable, to the constant.

5. An optimizer in accordance with claim 1, wherein said optimizer further comprises:

cost storage means for storing a plurality of machine language instructions and a cost indicative of an execute cycle and/or a code size of each of the machine language instructions, with associating the instruction with the cost, said first estimation means comprises:

first replace means for, after rewriting conducted by said first rewrite means, replacing each expression in the related expression set wherein a constant hold variable is an operand, with machine language instructions wherein a constant hold variable of the expression is an operand as an immediate data indicative of constant held by the constant hold variable; and first accumulation means for reading out a cost associated with each replaced machine language instruction from said cost storage means, accumulating the read out costs, and setting an accumulation result as an estimation result, and said second estimation means comprises:

second replace means for, after rewriting conducted by said first rewrite means, replacing, in the related expression set, each expression wherein a constant is substituted into the constant hold variable and each expression wherein a constant hold variable is an operand, with machine language instructions wherein a register storing the constant is set as an operand; and second accumulation means for reading out a cost associated with each replaced machine language instruction from said cost storage means, accumulating the read out costs, and setting an accumulation result as an estimation result.

6. An optimizer in accordance with claim 2, wherein said optimizer further comprises:

cost storage means for storing a plurality of machine language instructions and a cost indicative of an execute cycle and/or a code size of each of the machine language instructions, with associating the instruction with the cost, said first estimation means comprises:

first replace means for, after rewriting conducted by said first rewrite means, replacing each expression in the related expression set wherein a constant hold variable is an operand, with machine language instructions wherein a constant hold variable; and first accumulation means for reading out a cost associated with each replaced machine language instruction from said cost storage means, accumulating the read out costs, and setting an accumulation result as an estimation result, and said second estimation means comprises:

second replace means for, after rewriting conducted by said first rewrite means, replacing, in the related expression set, each expression wherein a constant is substituted into the constant hold variable and each expression wherein a constant hold variable is an operand, with machine language instructions wherein a register storing the constant is set as an operand; and second accumulation means for reading out a cost associated with each replaced machine language instruction from said cost storage means, accumulating the read out costs, and setting an accumulation result as an estimation result.

7. An optimizer in accordance with claim 3, wherein said optimizer further comprises:

cost storage means for storing a plurality of machine language instructions and a cost indicative of an execute cycle and-or a code size of each of the machine language instructions, with associating the instruction with the cost, said first estimation means comprises:

first replace means for, after rewriting conducted by said first rewrite means, replacing each expression in the related expression set wherein a constant hold variable of the expression is an operand as an immediate data indicative of the constant held by the constant hold variable; and first accumulation means for reading out a cost associated with each replaced machine language instruction from said cost storage means, accumulating the read out costs, and setting an accumulation result as an estimation result, and said second estimation means comprises:

second replace means for, after rewriting conducted by said first rewrite means, replacing, in the related expression set, each expression wherein a constant is substituted into the constant hold variable and each expression wherein a constant hold variable is an operand, with machine language instructions wherein a register storing the constant is set as an operand; and second accumulation means for reading out a cost associated with each replaced machine language instruction from said cost storage means, accumulating the read out costs, and setting an accumulation result as an estimation result.

8. An optimizer in accordance with claim 4, wherein said optimizer further comprises:

cost storage means for storing a plurality of machine language instructions and a cost indicative of an execute cycle and/or a code size of each of the machine language instructions, with associating the instruction with the cost, said first estimation means comprises:

first replace means for, after rewriting conducted by said first rewrite means, replacing each expression in the related expression set wherein a constant hold variable of the expression is an operand as an immediate data indicative of the constant held by the constant hold variable; and first accumulation means for reading out a cost associated with each replaced machine language instruction from said cost storage means, accumulating the read out costs, and setting an accumulation result as an estimation result, and said second estimation means comprises:

second replace means for, after rewriting conducted by said first rewrite means, replacing, in the related expression set, each expression wherein a constant is substituted into the constant hold variable and each expression wherein a constant hold variable is an operand, with machine language instructions wherein a register storing the constant is set as an operand; and second accumulation means for reading out a cost associated with each replaced machine language instruction from said cost storage means, accumulating the read out costs, and setting an accumulation result as an estimation result.

* * * * *